US008116819B2

(12) United States Patent
Niu et al.

(10) Patent No.: US 8,116,819 B2
(45) Date of Patent: Feb. 14, 2012

(54) ARRANGEMENTS FOR BEAM REFINEMENT IN A WIRELESS NETWORK

(75) Inventors: Huaning Niu, Milpitas, CA (US); Oinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 12/317,971

(22) Filed: Dec. 31, 2008

(65) Prior Publication Data

US 2010/0164805 A1 Jul. 1, 2010

(51) Int. Cl.
*H04M 1/00* (2006.01)
*H01Q 3/00* (2006.01)

(52) U.S. Cl. .................................... 455/562.1; 342/372

(58) Field of Classification Search ............... 455/562.1; 375/267; 342/372, 373, 374
See application file for complete search history.

(56) References Cited

U.S. PATENT DOCUMENTS 7,898,478 B2 * 3/2011 Niu et al. ..................... 342/377
7,929,918 B2 * 4/2011 Niu et al. ..................... 455/69
2009/0231196 A1 * 9/2009 Niu et al. ..................... 342/372
2010/0103045 A1 * 4/2010 Liu et al. ..................... 342/372

* cited by examiner

*Primary Examiner* — Robert Pascal
*Assistant Examiner* — Alan Wong
(74) *Attorney, Agent, or Firm* — Schubert Law Group PLLC

(57) ABSTRACT

A beamforming method is disclosed that includes performing sequential beam transmissions in multiple directions and receiving replies to the transmissions (i.e. a sector search). The received transmissions can include information or channel parameters such as direction of arrival, signal to noise ratio, signal strength, etc., for each sector. Utilizing the parameters transmitted or fed back by the receiver, the transmitter can store control vectors that dictate a beam that can be utilized to commence a beam refinement procedure. In addition, the parameters can be utilized to select and implement a custom sequence to refine the communication channel between the device and the controller. The custom sequence can significantly reduce the time required to create a channel with acceptable qualities such that efficient high speed network communications can be conducted. Other embodiments are also disclosed.

20 Claims, 4 Drawing Sheets

ARRANGEMENTS FOR BEAM REFINEMENT IN A WIRELESS NETWORK

FIELD OF INVENTION

The present disclosure is related to the field of wireless communication, and more particularly, to the field of beamforming between devices.

BACKGROUND

In a typical wireless network, many devices can enter an area serviced by a wireless controller and communications can be set up between the devices and the controller. Thus, a significant overhead is required for a device to "join" a network. To facilitate an efficient set up between multiple networkable devices, communications must be effectively configured and managed. Thus, a typical wireless network has a communications coordinator/controller such as an access point, a piconet controller (PNC), or a station that configures and manages network communications. After a device connects with the controller, the device can access other networks such as the Internet. A PNC can be defined generally as a controller that shares a physical channel with one or more devices, such as a personal computer (PC) or a personal digital assistant (PDA), where communications between the PNC and devices form a network.

The Federal Communications Commission (FCC) limits the amount of power that network devices can emit during transmissions. Due to the number of networks, crowded airways, requirements to accommodate more devices and the and low power requirements, new wireless network standards continue to be developed. Accordingly, there has been a lot of activity to develop low power network communications in the 60 GHz range utilizing directional communications with millimeter waves. An omni-directional transmission or communications different from a directional communications/transmission generally provide a single antenna point source radiation pattern where the signal energy propagates evenly in a spherical manner unless obstructed by an object. In contrast, in directional communications the signal from a transmitter and a receiver sensitivity can be projected or focused in a particular direction. With such high frequency low power signals, directional transmissions or beams that can project communications in the direction of the receiving entity are advantageous and important. Likewise, receive systems that can steer receive sensitivity in particular direction (i.e the direction of where the transmission originates) are very important and advantageous. It can be appreciated that traditional omni-directional transmissions/communication systems cannot provide reliable low power, high data rate communications at distances of over a few meters. Generally, directional antennas or antenna arrays can provide gains that are much higher than omni-directional antennas by forming a narrower beam that focuses radio frequency power towards the receiving system. Likewise, a receiver can focus it's receive sensitivity in a particular direction. Thus, a transmitter can focus signal energy in the direction of the desired receiver and a receiver can focus it's receive sensitivity in the direction of the transmitting source to provide an efficient system.

A directional transmission system can provide improved performance over omni-directional systems due to the increased signal strengths between devices and decreased interference from devices transmitting from directions where the receiver is less sensitive. Higher data rates, on the order of a few Gigabits per second, are possible in a directional transmission mode since the directional link employs directional antennas and benefits from higher antenna gains. However, these directional systems are typically more complex, slower and more expensive than traditional omni-directional transmission systems. After the association and beam calibration process, efficient data exchange between the device, the controller and other networks such as the Internet can occur.

It can be appreciated that many network environments, such as offices, office buildings, airports, etc., are becoming congested at network frequencies as many devices enter a network, exit the network and move in relation to the controller of the network. Setting up directional communication and tracking movement of devices in traditional systems requires a relatively long, inefficient association time and set up time for each device. Such continued increase in the number of users for an individual network continues to create significant problems.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

Figure 1:
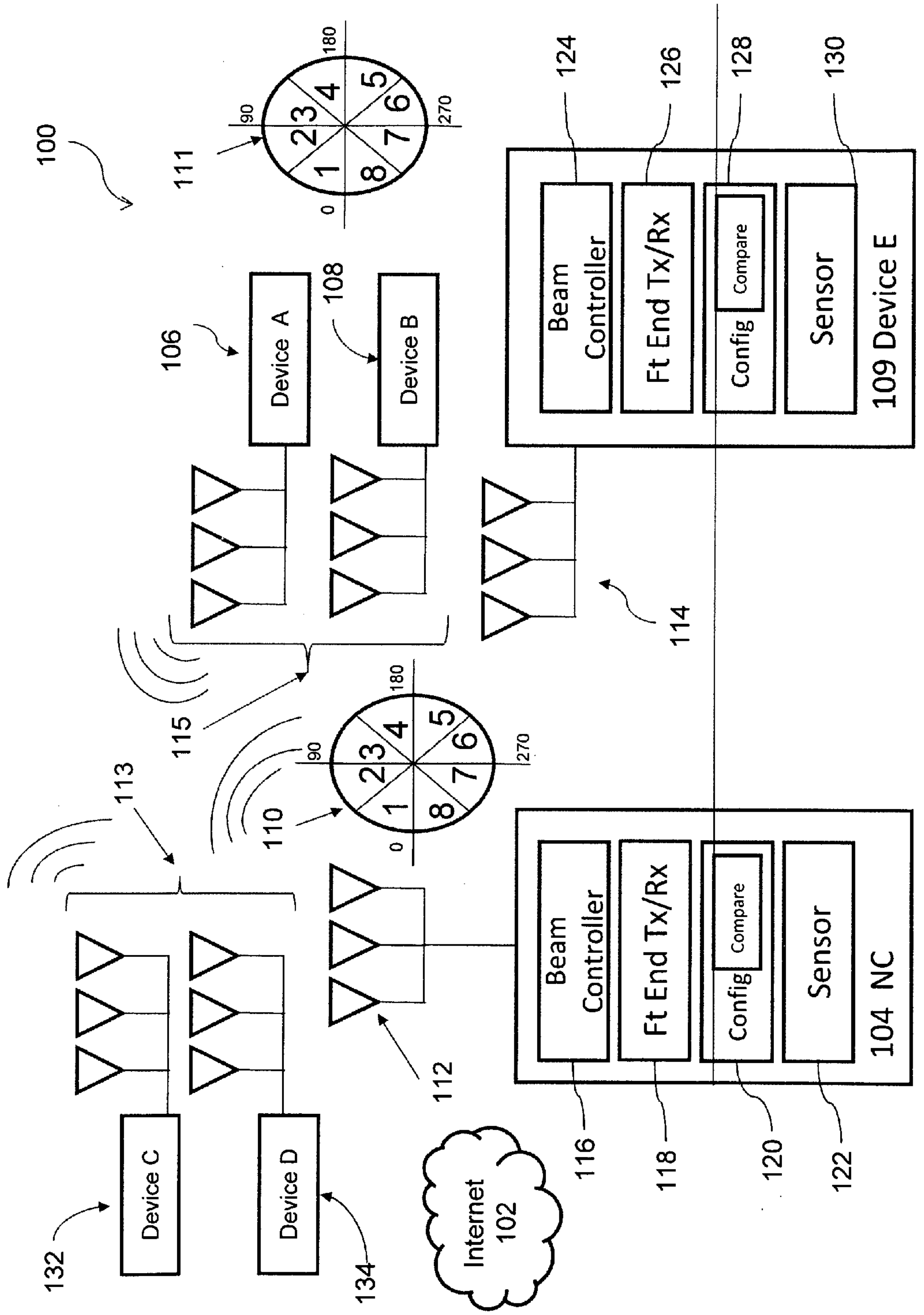
FIG. 1 is a block diagram of a network that can set up network communications.

The following is a detailed description of embodiments of the disclosure depicted in the accompanying drawings. The embodiments are in such detail as to clearly communicate the disclosure. However, the amount of detail offered is not intended to limit the anticipated variations of embodiments. The description that follows is for purposes of explanation and not limitation. Specific details are set forth, such as particular structures, architectures, interfaces, techniques, etc., in order to provide a thorough understanding of the various aspects of the invention. However, it will be apparent to those skilled in the art having the benefit of the present disclosure, that the various aspects of the disclosure may be practiced in versions that depart from these specific details. In certain instances, descriptions of well-known devices, circuits, and methods are omitted so as not to obscure the description of the claimed embodiment with unnecessary detail. The intention is to cover all modifications, equivalents, and alternatives falling within the spirit and scope of the present disclosure as defined by the appended claims.

Arrangements in the form of systems, apparatuses, methods and computer readable media are disclosed herein that can provide efficient set up and communication between a network communication controller (NC) and one or more devices in a wireless network. Communication set up and management for a wireless network can include beaconing, device discovery, location detection, probing, association requests, association acknowledgements, authorization requests, authorization acknowledgements, beamforming and other overhead functions. It can be appreciated that the location of a device that desires to join a network (or relative location of a device with respect to a controller) will not be known when a device enters an area serviced by a controller. In a busy network it is desirable to conduct an efficient device start up process that can quickly determine relative directions such that beamforming control vectors or parameters can be quickly and accurately determined. Such a setup process can include a "sector sweep" to determine general location relationships between a device and a controller followed by a training sequence or beam refinement process (training) where beams are accurately focused. The disclosed arrangements provide fast and efficient beam refinement arrangements by tailoring the training process based on the quality of the channel as determined by or measured in a previous phase.

To address such a set up, several standardization bodies including IEEE 802.15.3c, ECMA TG20, WiHD, NGmS and 802.11 VHT are working on standards to set up network communications for networks utilizing gigabytes per second (Gbps) 60 GHz or millimeter wave communications. Generally, the path loss for transmission in the 60 GHz range is very high and the efficiency of a complementary metal oxide semiconductor (CMOS) power amplifier at 60 GHz is relatively low. Therefore, directional transmission of data is important to achieve the desired 10 meter coverage. In addition, the array gain from transmit and receive beamforming is important to achieve the signal to noise ratio (SNR) that is desired for reliable data communications.

To implement low power gigahertz communications, a phased antenna array can acquire parameters and learn what directional, beamed transmissions provide acceptable results. Prior to providing such directional transmissions, control vectors that control the beam can be determined during an iterative learning set up process. This process can include a directional search and directional data acquisition, or beam search and acquisition process that can determine acceptable and often optimal phase control values that provide desirable SNRs for network transmissions or network channels. The standardized/proposed/current state of the art beam search and refinement topologies that are being developed and refined by the standard committees for phased array antennas are all based on an comprehensive iterative approach where the comprehensive process is performed at every step regardless of current channel performance (i.e. the process is the same even if the channel is best case or worst case). This "assume worst case" mentality unnecessarily consumes significant time, energy and resources even in systems with only one omni-receiving antenna. The standardized beam search can start with a sector sweep to determine a general relative direction between a device and a controller and then, worst case iterative beam refinement steps are continuously repeated. It can be appreciated that often after controls for general beam directions are determined for a phased array that is well calibrated, no further refinement (or only a small refinement) may be necessary. However, in some circumstances where minimal sectors are tried and the phased arrays are not calibrated, significant beamform training or refinement may be necessary because the beam refinement stage creates the majority of the gain. Accordingly, without such refinement, high speed network communications cannot be achieved.

Many embodiments are disclosed that allow for efficient set up for network communications. In one embodiment, a beamforming method can include performing sequential beam transmissions in multiple directions (channels) and receiving a reply to the sequel beam transmissions, transmitted by the device receiving the sequential transmissions. The received transmissions can include information or parameters on channels such as direction of arrival, signal to noise ratio (SNR), signal to interference plus noise ratio (SINR), signal strength, etc., and the parameters can be acquired based on properties of the received (or possibly not received) transmissions. Utilizing the parameters such as the direction of arrival, intensity and noise level transmitted back to the sequential transmitter or the controller, the transmitted can determine and store vectors that control the beam in the appropriate direction. Then, based on another iteration of the control vectors can be refined/adjusted or calibrated, with a minimum training transmission such that efficient high speed communications can be conducted between the controller and the network device.

In some embodiments, after one or more communication parameters are acquired, the parameters can be compared to stored parameters, metrics or predetermined parameters and, when the one or more acquired parameters are within a specific range or are above or below some predetermined limits based on the compare, a training sequence can be selected that is tailored to minimize the time required to complete the set up process. For example, if the acquired parameter indicates a less than desirable SNR, a maximum training process may be selected or, if the acquired parameter indicates a desirable SNR or SINR, some level of a reduced training process can be implemented. More specifically, if the parameters indicate that a beam in a specific direction will provide an acceptable communication channel and that the arrays are calibrated, then the beam training process can be significantly reduced. Thus, the detected parameters can dictate which tailored beam training process is implemented, thereby significantly reducing the overhead for wireless networks.

Multiple schemes are disclosed herein that can gather information on channel conditions and, based on the channel conditions, a tailored beamform setup process can be implemented. In some embodiments, a SNR or SINR for a channel can be estimated and, based on the estimation, the sequence length utilized to complete the beam training process can be significantly reduced. In some embodiments, it can be determined if one of the antenna arrays is calibrated and, if one or both of the arrays is calibrated, the sequence length can be reduced accordingly. In some embodiments, a process for completing the beamforming set up can be selected based on what system information is acquired. In some embodiments, the calibration information may be sent explicitly or implicitly by the transmitter without the estimation at the receiver. For example, the transmitter may explicitly send a message to receiver saying that the transmit and/or the receive antenna array(s) at the transmitter is calibrated. For another example, the transmitter may send different training sequences to implicitly indicate the calibration conditions: calibrated transmit, calibrated receive, uncalibrated transmit, and uncalibrated receive antenna arrays. For the case that the calibration information of one device is estimated by the other device, the SNRs or SINRs obtained from the sector sweep can be utilized. For example, if one sector's received SNR is much higher than the rest, the receiver with omni receive model may believe the transmit antenna array is calibrated. After the calibration information is acquired, the beam training sequence used in the subsequent training process can be optimized and selected accordingly.

In some embodiments, a first pass at training can be performed based on previously acquired system information then, system information can be acquired during the first pass and such information can be utilized to select a sequence to be utilized during another pass. Such an iterative process can quickly form beams that provide acceptable, possibly optimized communications. Alternately stated, after the first training process is selected and implemented, additional transmissions can be made, additional parameters can be acquired and another training process can be selected and implemented based on this second iteration. Even though more decisions and selections are conducted, other time consuming steps or portions of steps can be reduced or eliminated, thus reducing overhead and set up time for most wireless devices. In some embodiments, the spreading length, number or symbol transmissions or training time during a communications set up can be reduced, possibly "minimized", thereby reducing the set up time or training time currently required for milli-meter wave network systems.

Referring to FIG. 1, a basic configuration of a wireless network (WN) 100 is illustrated. The WN 100 can include a first network controller NC 104, device A 106, device B 108, device C 132, device D 134 and a device that desires to join the network, device E 109. Each device can have a steerable antenna system illustrated by antenna arrays 112, 113, 115 and 114. NC 104 and device E 109 can include a beam controller 116 and 124, a front end or a transceiver (TX/RX) 118 and 126, a compare/configuration module 120 and 128 and sensor modules 122 and 130. Although NC 104 and device E 109 is shown with an antenna array (112 and 114) other hardware, such as more or less antennas or a single highly directional antenna could be utilized. NC 104 can facilitate a communication set up between NC 104 and devices such as device A106, B 108, C 132, D 134 and E 109. In accordance with FIG. 1, it can be assumed that NC 104 is located in proximity to devices (less than 15 meters) such as device E 109 and that device E 109 can detect NC's 104 non-directional set up transmissions and NC 104 can detect device E's 109 non-directional set up transmissions.

The disclosed system 100 can adapt the length of a sequence length for training stages utilized in a beam refinement process. The disclosed system can dramatically improve the overall system startup efficiency compared to traditional systems. In some embodiments, front end transceiver (TX/RX)s 118 and 126 and beam controllers 116 and 124 can perform omni-directional and directional transmissions during sector sweeps or during sequence transmissions as part of iterative training steps.

During the intra transmissions sensors 122 and 130 can measure communication parameters such as received power, beamforming gain and improvements in beamforming gain during a setup process. The data acquired by the sensors 122 and 130 can be utilized by the configuration/compare modules 120 and 128 and, based on the magnitude of the parameters or the configuration/compare modules 120 and 128, can quantify channel parameters. Subsequent sequence transmissions can be customized based on the quantified parameters to significantly reduce the setup time for a device entering the network. Such a customized sequence is most often a small subset of a traditional sequence.

The WN 100 could be a wireless local area network (WLAN) or a wireless personal area network (WPAN) or another network that complies with one or more of the IEEE 802 set of standards. NC 104 can be connected to one or more networks such as the Internet 102. In some embodiments, the WN 100 could be a piconet that defines a collection of devices with a piconet controller that occupies shared physical channels with the devices. In some embodiments, a device such as a personal computer can be set up as NC 104 and the remaining devices A 106, B 108, C 132, D 134 and E 109 can then "connect" to the WN 10 via control/management functions, such as beamforming, that can be efficiently administrated by NC 104.

It can be appreciated that the NC 104 can support communication setup and communications with most wireless technologies including wireless handsets such as cellular devices, hand held, laptop or desktop computing devices that utilize WLAN, Wireless Mobile Ad-Hoc Networks (WMAN), WPAN, Worldwide Interoperability for Microwave Access (WiMAX), handheld digital video broadcast systems (DVB-H), Bluetooth, ultra wide band (UWB), UWB Forum, Wibree, WiMedia Alliance, Wireless High Definition (HD), Wireless uniform serial bus (USB), Sun Microsystems Small Programmable Object Technology or SUN SPOT and ZigBee technologies. The WN 100 can also be compatible with single antenna, sector antennas and/or multiple antenna systems such as multiple input multiple output systems (MIMO).

In operation, device E 109 can enter the network region or can be powered up in the region. Device E 109 can listen for a periodic beacon transmission made by NC 104. Based on receipt of the beacon transmission, device E 109 can transmit an association request signal to the NC 104 as the connection process begins. Generally, the NC 104 and device E 109 can monitor and utilize specific frequencies for transmitting the beacon and the beacon can contain network timing assignment information that can be utilized to synchronize transmissions for the beamforming process. In some embodiments, when device E 109 is attempting to join the network 100, the device E 109 and the NC 104 can implement a sequence length during beamforming after determining a link budget and a quality of array calibration.

Initially, the configuration module 120 can control the front end module 118 and the beam controller 116 to transmit beams in different sectors via sequential transmissions. This can be referred to as a sector sweep. Sector map 110 has divided up the relative directions around the NC 104 into eight sectors. Device E 109 can know the sector sequence and timing and can acquire parameters of transmissions in each sector. The number and orientation of the sectors is not a limiting feature as more sectors or less sectors or nearly any orientation could be utilized. During the sector sweep, the front end 126 of the device E 109 can receive the signals of the sector sweep and the sensor 130 can detect or acquire parameters of possible channels.

It can be appreciated that, when NC 104 transmits in sectors 1, 2, 7 and 8, device E 109 may not be able to receive an intelligible signal and the SNR of the transmission made by NC 104 in these sectors can be estimated or determined by sensor 130 as poor, undesirable or unacceptable. In some embodiments, the sensor 130 can send the acquired sector related data to the configuration/compare module 128 and the configuration/compare module 128 can compare the acquired data to predetermined metrics and can rank the sectors and determine which sector has the best communication parameters. The configuration/compare module 128 can then initiate a transmission back to the NC 104 indicating which sector appears to provide the best communication properties.

In one example, sensor 130 can receive a transmission sent by NC 104 in sector 5 and configuration/compare module 128 can determine that transmissions by NC 104 in sector 5 have a very high or desirable SNR ratio. Device E 109 can send this information to the NC 104 and, after the sector sweep, further beam refinement processing can be commenced. In sector transmissions where a very low SNR is determined these sectors can be tagged as undesirable sectors.

In a similar process, the configuration/compare module 128 of device E 109 can control front end module 126 and the beam controller 124 to transmit or receive beams in different sectors via sequential transmissions. Device sector map 111 can be utilized by device E 109 to conduct a sector sweep. A sector sweep can be conducted by NC 104 or device E 109 on receive or transmit antenna array. NC 104 can know the sector index, the training sequence and timing, and can acquire parameters of transmissions made by the device E 109 in each sector. During the sector sweep, the front end 118 of the NC

104 can receive the signals of the sector sweep and the sensor 130 can detect or acquire parameters of possible channels and these parameters can be sent back to the device E 109 to implement beamforming. Generally, the sector sweep can determine direction of arrival of sector transmissions and the gain of the array can be "optimized" in the relative direction of the transmitting source. The configuration/compare modules 120 and 128 can steer the signal by steering vectors or control vectors that can change phase lengths of signal paths and can coherently amplify the desired signals to create beams in the desired direction.

Figure 2:
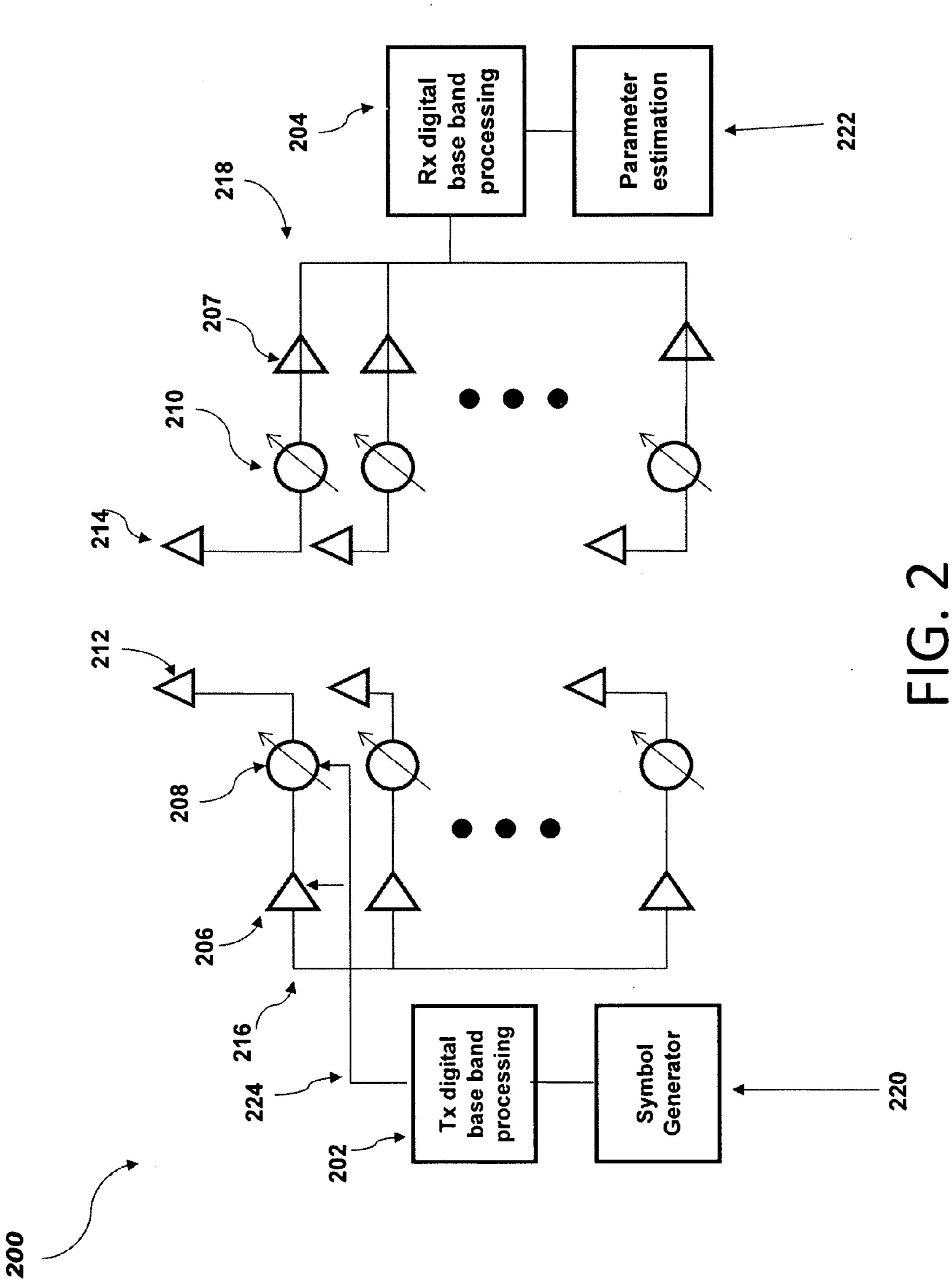
FIG. 2 is a block diagram of a network that can beamform.

Referring to FIG. 2, a system 200 that can achieve beam steering is illustrated in a block diagram format. The system 200 can include a digital baseband transmitter (Tx) 202, a digital baseband receiver (Rx) 204, amplifiers 206 and 207, phase shifters 208 and 210 and antennas 212 and 214. It can be appreciated that, for simplicity, only one transmit path 216 and only one receive path 218 will be described, however, many different paths can be utilized to achieve the desired antenna gain. Generally, the more paths and antennas utilized the more gain that can be achieved by a transmitting or receiving system.

After the "best" sector has been selected (possibly based only on the acquired low SNR) for both the device and the controller, a beam refinement process can be commenced. Beam searching or beam refinement can be performed even in sectors having very low SNR regions. In such regions, long pseudonoise (PN) code symbol sequences called "chips", can be required in order to get the spreading gain to a desirable level. A long PN sequence can be utilized to "pull" the working SNR to a positive region so that the controller and the device can acquire sufficiently accurate channel estimation results. Symbol generator 220 can phase-modulate a sine wave pseudorandomly with the continuous string of PN code symbols, where each symbol has a much shorter duration than an information bit or data. That is, each information bit is modulated by a sequence of much faster chips. Therefore, the chip rate is much higher than the information signal bit rate.

Thus, as part of beamforming, the transmitter 202 can utilize a signal structure in which the sequence of chips produced by the transmitter 202 is known a priori by the receiver 204. The receiver 204 can then use the same PN sequence to counteract the effect of the PN sequence on the received signal in order to reconstruct the information signal. Parameter estimation module 222 can then estimate channel parameters such as signal to noise ration of the channel.

Based on the sector sweeps and acquired parameters, the incoming direction of the signal or the direction of origin of the energy can be determined by the parameter estimation module 222 of the receiver portion of the system. Based on such detection, a longer or shorter PN sequence can be utilized by the transmitter 202 to achieve acceptable beamforming control. It can be appreciated that control signals 224 can be sent to amplifiers, such as amplifier 206 and phase shifters, such as phase shifter 208, such that an acceptable beam can be created by the transmitter portion 202 of the system 200 and the receive portion 204 of the system 200. The control signals 224 can be viewed as weights where analog components, such as the amplifiers and phase shifters, can be assigned different weights. A codebook can be a look up table that assigns different weights to amplifiers and phase shifters in an attempt to converge the beam where desired and the "optimum" weights can provide the desired beam. The components illustrated as the transmitter side 202 can present, in both a controller and a device, such that both the controller and the device can achieve beamforming for both their transmit and receive procedures.

One parameter that can affect the SNR as determined by the parameter estimation module 222 in the sector sweep stage (and maybe also the refinement stage) is the quality of calibration of the antenna arrays for the transmitter and/or the receiver. Another factor that can affect the SNR estimation is the "codebook design" or algorithm utilized by the transmitter and/or receiver in the sector sweep process. For example, assuming an un-calibrated phased array with 36 antennas to be utilized in transmitting and receiving, the beamforming gain after the sector sweep can be determined to be around 6 decibels (dB). However, if the phase array is well calibrated and the codebook has an efficient algorithm or the codebook has a good design, the gain after the initial sector sweep can be over 20 dB. Thus, when it is determined by the parameter estimation module 222 that the gain after the sector sweep is 20 dB, the transmitter 202 can be controlled such that the balance of the beam control vector determination process can be greatly reduced as a minimal number of symbols can be transmitted by the transmitter 202 to complete the beamforming process for the transmitter 202.

Figure 3:
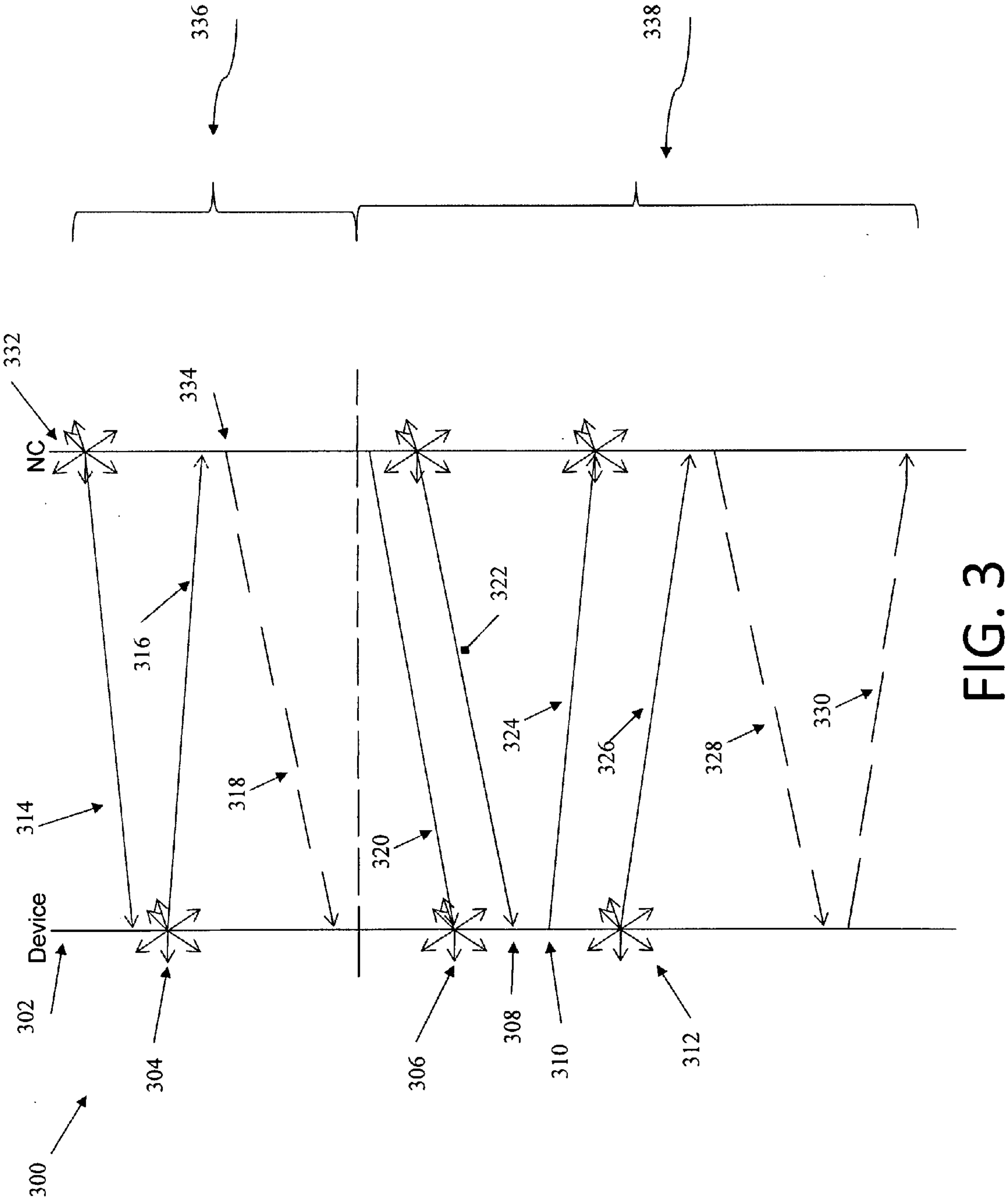
FIG. 3 is a diagram of information exchange between a device and a controller for configuring communications between a controller and a device.

Referring to FIG. 3, a communication session diagram 300 for beam refinement is illustrated. As stated above, due to power requirements, data rates, congestion, interference etc., beamforming is virtually essential for networks utilizing frequencies near the 60 GHz range to communicate. To achieve desirable beams for directional communications, such networks often perform a training procedure to determine control commands that will provide the desired beams. To determine such control commands, network systems commonly utilize a beamforming training sequence. Traditional beamforming methods consume a significant overhead and take a significant amount of time to complete. Traditional or even state of the art beamforming training protocols do not adapt to conditions such as channel qualities or calibration qualities. Thus, current training protocols are designed for and conduct procedures that are to accommodate "worst case" scenarios or poor channel qualities with no calibration.

Therefore, implementing a worst case beamforming procedure every time a device enters the network is a very inefficient usage of available bandwidth because in most cases the channel qualities and calibration qualities are much better than the worst case. FIG. 3 shows one way to adapt the beamforming process so that the spreading length (or training time) is reduced proportionally to the determined channel and array calibration qualities.

Network controller NC 332 is illustrated as transmitting and receiving from the right side and device 302 is illustrated as transmitting and receiving from the left side. Transmissions 314 can be a directional transmission as part of a sector sweep from the NC 332 to the device 302, where the device 302 can receive in an omni-directional mode. Transmissions 316 from device 302 can be sector sweep transmissions in the form of directional transmissions and such transmissions can carry information such as channel parameters and directional information acquired from sector sweep transmissions 314. The NC 332 can receive the directional transmissions in an omni-directional mode and the NC 332 can perform transmissions 318 which have data indicating the "best" sector for the device 302 to utilize and possibly a SNR for the best sector. Transmissions 314, 316, and 318 can be considered as sector search transmissions 336.

As stated above a sector sweep is generally an initial part of the beamform process where the relative direction of an incoming transmission can be determined by steering a receiving beam to different sectors and determining which sector receives the highest desired signal. More specifically, a sector sweep can be viewed as a process wherein a transmitter and a receiver sequentially try different sectors (sweep different sectors) and measure signal strength for the desired frequency. The sector that receives the highest signal level of a desired frequency can be selected for further analysis. Beamforming vectors (control signals for the amplifiers and phase shifters) can be utilized to control the transmitter and receiver such that the device or controller can utilize the best sector. The configuration can be a configuration as described, defined and stored in a quantization table or codebook. Generally, the quantization codebook can divide channel space into multiple sectors to be tried and monitored (decision regions), and hence the name sector sweep. Each device can usually know if its transmit and receive antenna arrays are calibrated. However, it doesn't usually know the other device's calibration situation. Within the sector sweep, the devices can make use of the channel and calibration information acquired from the previous steps to optimize the training sequence length. For example, if the received SNR in transmission 314 is high, then the sequence length in 316 can be reduced.

The initial beamforming gain measurements obtained from the sector sweep allows the transmitter and receiver to refine the beamforming vectors in later stages without the need for long training sequences. Further, the beamforming gain at the receiver also helps in reducing the feedback overhead. The codebook design in implementation can be dependent.

After the sector sweep, beam refinement can be attempted. A sector search can be followed by beam refinement stages, such as three stages where the transmitter and receiver beamforming vectors are iteratively brought closer to the optimal vectors. Each beam refinement stage can start with a receive vector training step followed by a transmit vector training step. Steps involved in beam search or beam refinement are shown in FIG. 2. The actions taken in each step are described.

As stated above, beamforming is virtually necessary for systems operating in the 60 GHz range. However the beamforming training is a significant overhead and consumes a relatively large amount of time. The more devices in a network the more overhead required to operate a system. Due to the large number of devices often present in a network, it is desirable to reduce the beam search overhead in order to achieve higher network efficiency. In state of the art wireless network systems, the beamforming training protocol does not adapt to either the channel or the calibration qualities and is designed for the worst case scenario. Therefore, the beamforming training is not efficient for most of the cases where the channel and calibration qualities are much better than the worst case scenarios.

Training transmissions made after the sector sweep 336 can be referred to as beam refinement iteration stages/transmissions 338 where such transmission 338 includes the PN symbol transmissions. In accordance with the present disclosure, the beam refinement transmissions 338 can be reduced in time and scope based on or commensurate with the communication parameters acquired during the sector sweep 336. More specifically, the sequence length can be continually adapted during the beam refinement iteration stages/transmissions 338. The refinement stages 338 can be an iterative process. Each iteration can be customized based on acquired channel parameters, where based on the acquired parameters, control vectors can be selected from a codebook and implemented. Further, the control vectors can be refined in successive iterations to provide higher beamforming gain for each iteration. Sequence lengths can be reduced for each iteration as the number of iterations goes higher.

It has been determined that there is a relationship between beamforming procedure performance, acquired SNR (or SINR) and different/shorter sequence lengths. It has also been determined that "optimal" sequence lengths for a SNR of −20 dB are 255 511 255 and 255 symbols for iterations indicated by transmissions 320, 322, 324 and 326 which consist of two distinct spreading lengths. During transmissions 304, 306, 308, 310, 312, 328, and 330, symbols can be transmitted and a SNR measurement can be determined as the beam gets closer to an acceptable or "optimum" range.

Figure 4:
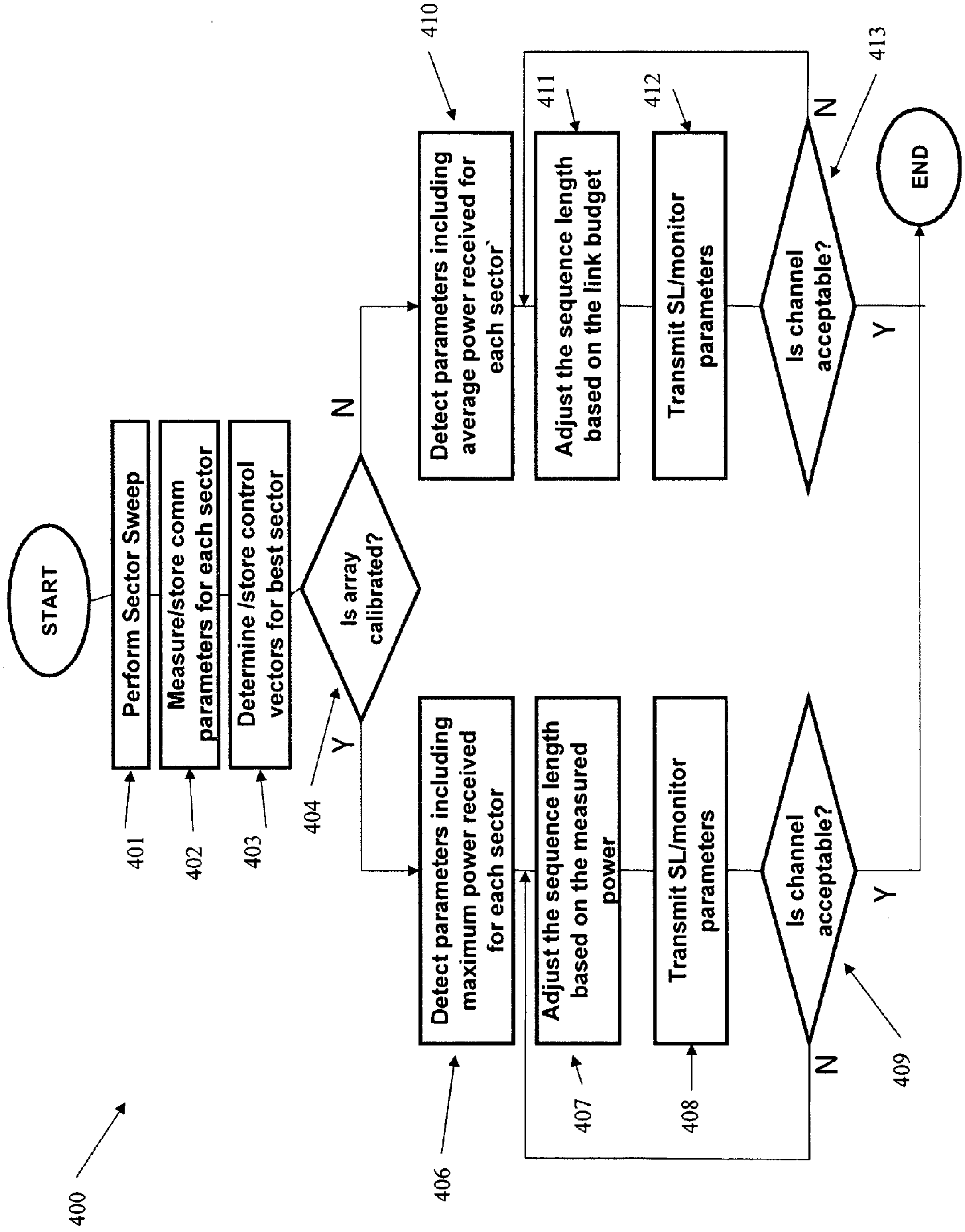
FIG. 4 is a flow diagram illustrating one arrangement for synchronizing networks.

Referring to FIG. 4, a flow diagram 400 for two different beam forming sequence adaptations is disclosed. As stated above, the sequence length for beam refinement can be reduced from traditional lengths based on a SNR measurement or measurement acquired as part of the sector sweep. As illustrated by block 401, a sector sweep can be performed. As illustrated by block 402, the receiving device can detect communication parameters such as receive power and SNR and can store such parameters. The communication parameters can include the power level of the received signal for each sector transmission during the sector sweep. Other parameters can include signal strength, gain, and directional data, to name a few. Likewise and as illustrated by block 403, the controller can detect channel parameters, such as the power level and the SNR of the received signal for each sector transmission during the sector sweep, and can determine and store control vectors for best sector.

In some embodiments, a calibrated amount of energy can be transmitted by the transmitter and a measurement of the received energy can provide an estimate signal to noise ratio. As illustrated by decision block 404, it can be determined if the transmitting array is calibrated. As illustrated by block 406, the maximum power can be detected for each received sector transmission. As illustrated by block 407, the sequence length can be determined based on the detected parameters, such as measured detected power and SNR. The determination can be a selection from a design codebook where the selection is based on the received power or parameters.

As illustrated by 408, the selected sequence length (SL) can be transmitted and parameters such as power received can be monitored. As illustrated by decision block 409, it can be determined of the communication channel is acceptable. If the channel is acceptable then the process can end and if the channel is unacceptable then the sequence can be adjusted as the process reiterates to block 407.

Referring back to decision block 404, if the array is not calibrated then, as illustrated by block 410, parameters such as the average power received for each sector can be determined. As illustrated by block 411, the sequence length can be adjusted based on the link budget. A link budget is the accounting of all of the gains and losses from the transmitter, through the medium (free space, cable, waveguide, fiber, etc.) to the receiver in a telecommunication system. It accounts for the attenuation of the transmitted signal due to propagation, as well as the antenna gains, feedline and miscellaneous losses. Randomly varying channel gains such as fading are taken into account by adding some margin depending on the anticipated severity of its effects. The amount of margin required can be reduced by the use of mitigating techniques such as antenna diversity. A simple link budget equation can be: Received Power (dBm)=Transmitted Power (dBm)+Gains (dB)−Losses (dB).

Generally, to support a targeted communications rate and reliability rating, the received signal power, the channel attenuation/fluctuation, the required received signal to noise plus interference ratio (SINR) can be accounted for. The calculation and estimation processing that provides acceptable conditions is referred to herein as the link budget. The sequence length can be transmitted and parameters of the transmission monitored, as illustrated by block 412. It can be determined if the channel is acceptable, as illustrated by decision block 413. If the channel parameters are unacceptable then the process can revert to block 411 and the sequence length can be adjusted. If the channel parameters are acceptable, then the process can end. The process above can be conducted for both the device and the controller. As illustrated, fast bi-directional beamforming can be conducted with or without a calibrated array.

It can be appreciated that a beamforming process can be greatly reduced based on a received power based on power measurement that can reveal channel parameters such as a signal to noise ratio. In some embodiments, the sequence length can be reduced for each iteration, significantly reducing the time required to achieve an acceptable channel to conduct network communications. When it is determined that the channel is still unacceptable and a reduced sequence length is utilized in a successive iteration, significant beamforming gain can be achieved each iteration. An efficient codebook design can allow for reduced sequence length transmissions and such sequence lengths can be adapted based on a link budget and a sector sweep gain. Such a design could be efficiently implemented utilizing personal computer based applications.

Simulating a tailored or "optimized" PN sequence length based on an estimated communication channel quality shows much improved results over traditional processes that utilize a predetermined beamforming sequence of a predetermined length for each iteration, regardless of the quality of the channel or regardless of channel performance. In accordance with the present disclosure, when a poor channel with a worst case SNR is detected, the traditional very long PN sequence can still utilized, however, the beamforming sequence can be significantly reduced when it is determined that quality communication parameters exist. It can be appreciated that, in many cases, the disclosed system will detect many devices requesting connection to the network, where such devices are not close to the link budget limit region, because the operating SNR is much better than worst case. Thus, the PN sequence and beam refinement procedure can be greatly reduced.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In some embodiments, the methods disclosed can be implemented in software, which includes but is not limited to firmware, resident software, microcode, etc. Furthermore, the embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

System components can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD). A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure, that the disclosure contemplates methods, systems, and media that can provide the above mentioned features. It is understood that the form of the embodiments shown and described in the detailed description and the drawings are to be taken merely as possible ways to build and utilize the disclosed teachings. It is intended that the following claims be interpreted broadly to embrace all the variations of the example embodiments disclosed.

What is claimed is:

1. A beamforming method comprising:

performing sequential directional transmissions or receptions in more than one direction;

receiving at least one reply to the sequential directional transmissions or receptions;

acquiring at least one channel parameter based on the sequential directional transmissions or receptions; and selecting a beam training sequence based on the acquired at least one channel parameter.

2. The method of claim 1 further comprising comparing the at least one acquired parameter to a predetermined metric and the selecting is performed based on results of the comparing.

3. The method of claim 1 further comprising acquiring additional parameters and selecting a different beam training sequence based on the additional parameters.

4. The method of claim 1 wherein the at least one channel parameter relates to a signal to noise ratio or a signal to interference plus noise ratio.

5. The method of claim 1 wherein the at least one channel parameter relates to channel gain.

6. The method of claim 1 wherein the at least one channel parameter relates to a calibration of an antenna array.

7. The method of claim 1, further comprising performing channel estimation to determine a signal to noise ratio or a signal to interference plus noise ratio.

8. The method of claim 1 wherein the training sequence comprises transmitting a series of symbols.

9. The method of claim 8 wherein the series of symbols comprise a PN sequence.

10. The method of claim 1, performing the sequential directional transmissions in more than one direction until a SNR or SINR has a positive value.

11. The method of claim 1 wherein the sequential directional transmissions are performed utilizing frequencies above the 50 GHz range.

12. A system comprising:

a configuration module to control a beam training sequence;

a beam controller to adjust a beam during the beam training sequence;

a sensor to sense at least one channel parameter during the beam training sequence; and a compare module to compare the at least one channel parameter to a predetermined parameter and produce an output in response to the compare, the configuration module to tailor the beam training sequence in response to the output.

13. The system of claim 12, further comprising a transceiver and an antenna array coupled to the beam controller.

14. The system of claim 12, wherein the sensor is a signal to noise sensor or a signal to interference plus noise sensor.

15. The system of claim 12, wherein the beam training sequence comprises sending and receiving symbols.

16. A computer program product including a computer readable storage medium wherein the computer readable storage medium does not comprise transitory signal, the computer readable storage medium including instructions that, when executed by a processor cause a computer to:

performing sequential beam transmissions in more than one direction;

receiving at least one reply to the sequential beam transmissions;

acquiring at least one channel parameter based on the sequential beam transmissions; and adjusting a beam training sequence based on the acquired at least one channel parameter.

17. The computer program product of claim 16 that, when executed by the processor, causes the computer to compare the at least one channel parameter to a predetermined metric and to adjust a beam training sequence in response to the compare.

18. The computer program product of claim 16 that, when executed by the processor, causes the computer to adjust the training sequence by performing a specific variable training sequence.

19. The computer program product of claim 16 that, when executed by the processor, causes the computer to acquire one of a signal to noise ratio or signal to interference plus noise ratio, beamforming gain, or the presence of a calibrated antenna array.

20. The computer program product of claim 16 that, when executed by the processor, causes the computer to estimate a signal to noise ratio.

* * * * *